United States Patent
Fattal (10) Patent No.: US 10,852,560 B2
(45) Date of Patent: Dec. 1, 2020

(54) TWO-DIMENSIONAL/THREE-DIMENSIONAL (2D/3D) SWITCHABLE DISPLAY BACKLIGHT AND ELECTRONIC DISPLAY

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 203 days.

(21) Appl. No.: 15/640,131

(22) Filed: Jun. 30, 2017

(65) Prior Publication Data
US 2017/0329149 A1 Nov. 16, 2017

Related U.S. Application Data

(63) Continuation of application No. PCT/US2015/010934, filed on Jan. 10, 2015.

(51) Int. Cl.
*G02F 1/1334* (2006.01)
*G02B 30/27* (2020.01)
(Continued)

(52) U.S. Cl.
CPC .......... *G02B 30/27* (2020.01); *G02B 6/0036* (2013.01); *G02B 6/0051* (2013.01); *G02F 1/137* (2013.01);
(Continued)

(58) Field of Classification Search
CPC .. G02F 1/1334; G02F 1/133615; G02F 1/137; G02F 2001/133626;
(Continued)

(56) References Cited

U.S. PATENT DOCUMENTS 5,500,765 A    3/1996   Eichenlaub
5,561,558 A  * 10/1996  Shiono ................. G02B 5/1876
                                              359/565

(Continued)

FOREIGN PATENT DOCUMENTS

CN    1213097 A    4/1999
CN    1619373 A    5/2005
(Continued)

OTHER PUBLICATIONS

International Search Report (ISR), 3 pages, from KIPO (ISA/KR), dated Oct. 6, 2015, for counterpart parent PCT patent application No. PCT/US2015/010934.
(Continued)

*Primary Examiner* — Zheng Song
(74) *Attorney, Agent, or Firm* — J. Michael Johnon (57) ABSTRACT

A two-dimensional/three-dimensional (2D/3D) switchable display backlight and a 2D/3D switchable electronic display employ a switchable diffuser to support 2D/3D switching. The 2D/3D switchable display backlight includes a plate light guide, a multibeam diffraction grating to couple light out of the plate light guide and the switchable diffuser to intercept and selectably either pass or scatter light beams of the coupled-out light. The 2D/3D switchable electronic display includes the backlight and further includes a light valve array to modulate the coupled-out light. The switchable diffuser facilitates selectability between a three-dimensional pixel and a two-dimensional pixel of the 2D/3D switchable electronic display.

21 Claims, 4 Drawing Sheets

(51) Int. Cl.
*H04N 13/31* (2018.01)
*G02F 1/13357* (2006.01)
*H04N 13/356* (2018.01)
*F21V 8/00* (2006.01)
*G02F 1/137* (2006.01)

(52) U.S. Cl.
CPC ...... *G02F 1/1334* (2013.01); *G02F 1/133615* (2013.01); *H04N 13/31* (2018.05); *H04N 13/356* (2018.05); *G02F 2001/13756* (2013.01); *G02F 2001/133626* (2013.01); *G02F 2201/305* (2013.01); *G02F 2203/62* (2013.01)

(58) Field of Classification Search
CPC ..... G02F 2001/13756; G02F 2201/305; G02F 2203/62; G02B 6/0036; G02B 6/0051
See application file for complete search history.

(56) References Cited

U.S. PATENT DOCUMENTS

| | | | |
|---|---|---|---|
| 5,615,024 A | 3/1997 | May et al. | |
| 5,617,248 A | 4/1997 | Takahashi et al. | |
| 5,721,598 A | 2/1998 | Smith | |
| 5,729,311 A | 3/1998 | Broer et al. | |
| 5,926,294 A | 7/1999 | Sato et al. | |
| 6,011,602 A * | 1/2000 | Miyashita | G02B 6/0038 349/61 |
| 6,069,650 A | 5/2000 | Battersby | |
| 6,667,819 B2 | 12/2003 | Nishikawa et al. | |
| 6,980,271 B2 | 12/2005 | Fujishiro | |
| 7,436,594 B2 | 10/2008 | Van Berkel et al. | |
| 7,742,120 B2 | 6/2010 | Bayley et al. | |
| 7,773,849 B2 | 8/2010 | Shani | |
| 7,903,332 B2 | 3/2011 | De Zwart et al. | |
| 8,026,997 B2 | 9/2011 | Feng | |
| 8,035,762 B2 | 10/2011 | Ijzerman et al. | |
| 8,189,129 B2 | 5/2012 | Eichenlaub | |
| 8,619,363 B1 | 12/2013 | Coleman | |
| 8,681,423 B1 | 3/2014 | Gibson et al. | |
| 8,821,001 B2 | 9/2014 | Minami | |
| 8,873,004 B2 | 10/2014 | Bae et al. | |
| 9,036,099 B2 | 5/2015 | Hirakata | |
| 9,128,226 B2 | 9/2015 | Fattal et al. | |
| 9,201,270 B2 | 12/2015 | Fattal et al. | |
| 9,257,063 B2 | 2/2016 | Takahashi | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 2002/0008834 A1 | 1/2002 | Suzuki | |
| 2002/0075445 A1 | 6/2002 | Dabrowski et al. | |
| 2003/0011884 A1 | 1/2003 | Van Berkel | |
| 2003/0086649 A1 | 5/2003 | Zhou | |
| 2004/0130879 A1 | 7/2004 | Choi et al. | |
| 2004/0156182 A1 | 8/2004 | Hatjasalo et al. | |
| 2004/0156589 A1 | 8/2004 | Gunn et al. | |
| 2005/0041174 A1 | 2/2005 | Numata et al. | |
| 2005/0052732 A1 * | 3/2005 | Chen | G02B 6/0038 359/369 |
| 2005/0073627 A1 | 4/2005 | Akiyama | |
| 2005/0123229 A1 | 6/2005 | Huck et al. | |
| 2005/0140832 A1 | 6/2005 | Goldman et al. | |
| 2005/0201122 A1 | 9/2005 | Shinohara et al. | |
| 2005/0264717 A1 | 12/2005 | Chien et al. | |
| 2006/0008347 A1 | 4/2006 | Winkler | |
| 2006/0104570 A1 | 5/2006 | Rausch | |
| 2007/0058394 A1 | 3/2007 | Yu | |
| 2007/0129864 A1 | 6/2007 | Tanaka et al. | |
| 2007/0213955 A1 | 9/2007 | Ishida et al. | |
| 2007/0279367 A1 | 12/2007 | Kitai | |
| 2007/0298533 A1 | 12/2007 | Yang et al. | |
| 2008/0204663 A1 | 8/2008 | Balogh | |
| 2008/0204873 A1 | 8/2008 | Daniell | |
| 2008/0225393 A1 | 9/2008 | Rinko | |
| 2008/0285307 A1 | 11/2008 | Aylward et al. | |
| 2009/0091837 A1 | 4/2009 | Chao et al. | |
| 2009/0207342 A1 | 8/2009 | Yamaguchi et al. | |
| 2009/0213300 A1 | 8/2009 | Daiku | |
| 2009/0225244 A1 | 9/2009 | Wang et al. | |
| 2009/0244706 A1 | 10/2009 | Levola et al. | |
| 2009/0290837 A1 | 11/2009 | Chen et al. | |
| 2009/0322986 A1 | 12/2009 | Wei et al. | |
| 2010/0039832 A1 | 2/2010 | Ahlgren et al. | |
| 2010/0079584 A1 | 4/2010 | Sung et al. | |
| 2010/0103485 A1 | 4/2010 | Haussler | |
| 2010/0118117 A1 | 5/2010 | Kroll et al. | |
| 2010/0123952 A1 | 5/2010 | Chen et al. | |
| 2010/0177025 A1 * | 7/2010 | Nagata | G02B 6/0028 345/76 |
| 2010/0207964 A1 | 8/2010 | Kimmel et al. | |
| 2010/0284085 A1 | 11/2010 | Laakkonen | |
| 2010/0289870 A1 | 11/2010 | Leister | |
| 2010/0302803 A1 | 12/2010 | Bita et al. | |
| 2011/0002143 A1 | 1/2011 | Saarikko et al. | |
| 2011/0141395 A1 | 6/2011 | Yashiro | |
| 2011/0149596 A1 | 6/2011 | Lv et al. | |
| 2011/0157257 A1 | 6/2011 | Bennett et al. | |
| 2011/0157667 A1 | 6/2011 | Lacoste et al. | |
| 2011/0182570 A1 | 7/2011 | Yeh | |
| 2011/0188106 A1 * | 8/2011 | Bae | G02B 26/08 359/226.3 |
| 2011/0241573 A1 | 10/2011 | Tsai et al. | |
| 2011/0254916 A1 | 10/2011 | Fan et al. | |
| 2011/0304784 A1 | 12/2011 | Hirota et al. | |
| 2012/0008067 A1 | 1/2012 | Mun et al. | |
| 2012/0013962 A1 | 1/2012 | Subbaraman et al. | |
| 2012/0075698 A1 | 3/2012 | Minami | |
| 2012/0113678 A1 | 5/2012 | Cornelissen et al. | |
| 2012/0120213 A1 | 5/2012 | Ohyama et al. | |
| 2012/0127547 A1 | 5/2012 | Gocho et al. | |
| 2012/0127573 A1 | 5/2012 | Robinson et al. | |
| 2012/0127751 A1 | 5/2012 | Kimmel | |
| 2012/0147059 A1 * | 6/2012 | Chen | G02B 27/2214 345/690 |
| 2012/0176665 A1 | 7/2012 | Song et al. | |
| 2012/0249934 A1 | 10/2012 | Li et al. | |
| 2012/0250141 A1 | 10/2012 | Chen | |
| 2013/0057539 A1 | 3/2013 | Kim | |
| 2013/0082980 A1 | 4/2013 | Gruhlke et al. | |
| 2013/0201723 A1 | 8/2013 | Gourlay | |
| 2015/0009307 A1 | 1/2015 | Lee et al. | |
| 2015/0015816 A1 | 1/2015 | Bae et al. | |
| 2015/0022746 A1 * | 1/2015 | Ichihashi | G02F 1/133606 349/15 |
| 2015/0355403 A1 | 12/2015 | Santori et al. | |
| 2016/0018582 A1 | 1/2016 | Fiorentino et al. | |
| 2017/0090096 A1 | 3/2017 | Fattal | |

FOREIGN PATENT DOCUMENTS

| | | |
|---|---|---|
| CN | 101750664 A | 6/2010 |
| CN | 202126538 | 1/2012 |
| JP | H08190095 A | 7/1996 |
| JP | 2000267041 A | 9/2000 |
| JP | 2002031788 A | 1/2002 |
| JP | 2004077897 A | 3/2004 |
| JP | 2004302186 A | 10/2004 |
| JP | 2008083532 A | 4/2008 |
| JP | 2008164963 A | 7/2008 |
| JP | 2009053499 A | 3/2009 |
| JP | 2009288718 A | 12/2009 |
| JP | 2009295598 A | 12/2009 |
| JP | 2010102188 A | 5/2010 |
| JP | 2010237416 A | 10/2010 |
| JP | 2011029161 A | 2/2011 |
| JP | 2011133677 A | 7/2011 |
| JP | 2011232717 A | 11/2011 |
| JP | 2012022085 A | 2/2012 |
| JP | 2013195608 A | 9/2013 |

(56) References Cited

FOREIGN PATENT DOCUMENTS

| WO | 9908257 A1 | 2/1999 |
| WO | 2005011292 A1 | 2/2005 |
| WO | 2012069071 A1 | 5/2012 |

OTHER PUBLICATIONS

Morris, G. Michael et al., "Engineered diffusers(TM) for display and illumination systems: Design, fabrication, and applications," pp. 1-11, RPC Photonics, Inc. 330 Clay Road, Rochester, NY 14623 (www.rpcphotonics.com).

Montgomery, G. Paul, et al., "Light-Scattering from Polymer-Dispersed Liquid-Crystal Films—Droplet Size Effects," Journal of Applied Physics, Feb. 1, 1991, pp. 1605-1612, vol. 69, No. 3.

Izadi, Shahram et al., "Going Beyond the Display: A Surface Technology with an Electronically Switchable Diffuser," Proceedings of the 21st annual ACM symposium on User Interface software and technology, UIST'08, Oct. 19-22, 2008, pp. 269-278.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Xu et al., "Computer-Generated Holography for Dynamic Display of 3D Objects with Full Parallax," International Journal of Virtual Reality, 2009, pp. 33-38, vol. 8, No. 2.

Travis et al., "Collimated light from a waveguide for a display backlight," Optics Express, Oct. 2009, pp. 19714-19719, vol. 17, No. 22.

Fattal, David et al., "A multi-directional backlight for a wide-angle, glasses-free three-dimensional display," Nature, Mar. 21, 2013, pp. 348-351, vol. 495, Macmillan Publishers Limited, 2013.

\* cited by examiner

TWO-DIMENSIONAL/THREE-DIMENSIONAL (2D/3D) SWITCHABLE DISPLAY BACKLIGHT AND ELECTRONIC DISPLAY

CROSS-REFERENCE TO RELATED APPLICATIONS

This application is a continuation application of and claims the benefit of priority to prior International Application No. PCT/US2015/010934, filed Jan. 10, 2015, the entire contents of which is incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays, for example. Passive displays often exhibit attractive performance characteristics including, but not limited to, inherently low power consumption. However, passive displays may find somewhat limited use in many practical applications given their characteristic inability to emit light. To overcome this characteristic inability, a backlight is often employed in conjunction with passive displays to provide light emission from these displays.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples in accordance with the principles described herein provide for the display of information that supports switching between the display of two-dimensional (2-D) data and three-dimensional (3-D) data. In particular, in accordance with the principles described herein, information may be selectively displayed in either a 2-D mode or a 3-D mode. The 3-D mode may be employed to present images and similar information in conjunction with a so-called 'glasses-free' or autostereoscopic display system, while the 2-D mode may be used to present information that either lacks or at least does not benefit from a third dimension (e.g., information such as text, 2-D images, etc.). Moreover, the switchable 2-D and 3-D modes are provided on the same display unit or system, according to various examples of the principles described herein. A switchable display system that is capable of selectively displaying both 2-D information and 3-D information on the same display system may facilitate adapting a single display system to a much wider range of differing data presentation requirements than is possible using either a 2-D display alone or a 3-D display alone.

According to various examples, a variable or switchable diffuser is employed in conjunction with a directional or multiview display to facilitate switching between the display of 2-D and 3-D information. In particular, when the switchable diffuser is in a condition or state that scatters or diffuses light passing through the diffuser, a 2-D mode of display operation is provided. Alternatively, a 3-D operational mode of display operation is provided when the switchable diffuser is in a condition or state that passes (i.e., does not diffuse) light.

In some examples, the 2-D mode produced by the scattering or diffusing state of the switchable diffuser provides (or is) a high-resolution 2-D mode having a higher resolution than is provided by the 3-D operational mode. For example, a native resolution of a light valve array may be supported in the high-resolution 2-D mode, while the 3-D mode may support a lower resolution due to multiple views or beam angles used to present 3-D information. Using a switchable diffuser also facilitates switching between the 2-D mode and the 3-D mode on demand. Further, the switchable diffuser may provide substantially independent sections, segments or regions of the display having switchable diffusion to allow simultaneous display of 2-D information and 3-D information in different areas of the display system, according to some examples.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some examples, the light guide may include a coating in addition to or instead of the aforementioned refractive index difference to further facilitate the total internal reflection. The coating may be a reflective coating, for example. According to various examples, the light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small region of the plate light guide, the top and bottom surfaces are substantially parallel or co-planar. In some examples, a plate light guide may be substantially flat (e.g., confined to a plane) and so the plate light guide is a planar light guide. In other examples, the plate light guide may be curved in one or two orthogonal dimensions. For example, the plate light guide may be curved in a single dimension to form a cylindrical shaped plate light guide. In various examples however, any curvature has a radius of curvature sufficiently large to insure that total internal reflection is maintained within the plate light guide to guide light.

According to various examples described herein, a diffraction grating (e.g., a multibeam diffraction grating) is employed to scatter or couple light out of a plate light guide. Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves in a material surface) arranged in a one-dimensional (1-D) array. In other examples, the diffraction grating may be a two-dimensional (2-D) array of features. The diffraction grating may be a 2-D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., a diffractive angle). In particular, as a result of diffraction, light leaving the diffraction grating (i.e., diffracted light) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from light guide.

Further, by definition herein, the features of a diffraction grating are referred to as 'diffractive features' and may be one or more of at, in and on a surface (e.g., a boundary between two materials). The surface may be a surface of a plate light guide, for example. The diffractive features may include any of a variety of structures that diffract light including, but not limited to, one or more of grooves, ridges, holes and bumps at, in or on the surface. For example, the diffraction grating may include a plurality of parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

By definition herein, a 'multibeam diffraction grating' is a diffraction grating that produces coupled-out light that includes a plurality of light beams. Further, the light beams of the plurality produced by the multibeam diffraction grating have different principal angular directions from one another, by definition herein. In particular, by definition, a light beam of the plurality has a predetermined principal angular direction that is different from another light beam of the light beam plurality as a result of diffractive coupling and diffractive redirection of incident light by the multibeam diffraction grating. For example, the light beam plurality may include eight light beams that have eight different principal angular directions. The eight light beams in combination (i.e., the light beam plurality) may represent a light field, for example. According to various examples, the different principal angular directions of the various light beams are determined by a combination of a grating pitch or spacing and an orientation or rotation of the diffractive features of the multibeam diffraction grating at the points of origin of the respective light beams relative to a propagation direction of the light incident on the multibeam diffraction grating.

According to various examples described herein, a multibeam diffraction grating is employed to couple light out of the plate light guide, e.g., as pixels of an electronic display. In particular, the plate light guide having a multibeam diffraction grating to produce light beams of the plurality having different angular directions may be part of a backlight of or used in conjunction with an electronic display such as, but not limited to, a 'glasses free' three-dimensional (3-D) electronic display (e.g., also referred to as a multiview or 'holographic' electronic display or an autostereoscopic display). As such, the differently directed light beams produced by coupling out guided light from the light guide using the multibeam diffractive gratings may be or represent 'pixels' of the 3-D electronic display.

Herein, a 'light source' is defined as a source of light (e.g., an apparatus or device that produces and emits light). For example, the light source may be a light emitting diode (LED) that emits light when activated. Herein, a light source may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light).

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or in some examples, means plus or minus 10%, or plus or minus 5%, or plus or minus 1%, unless otherwise expressly specified. Further, the term 'substantially' as used herein means a majority, or almost all, or all, or an amount within a range of about 51% to about 100%, for example. Moreover, examples herein are intended to be illustrative only and are presented for discussion purposes and not by way of limitation.

Figure 1A:
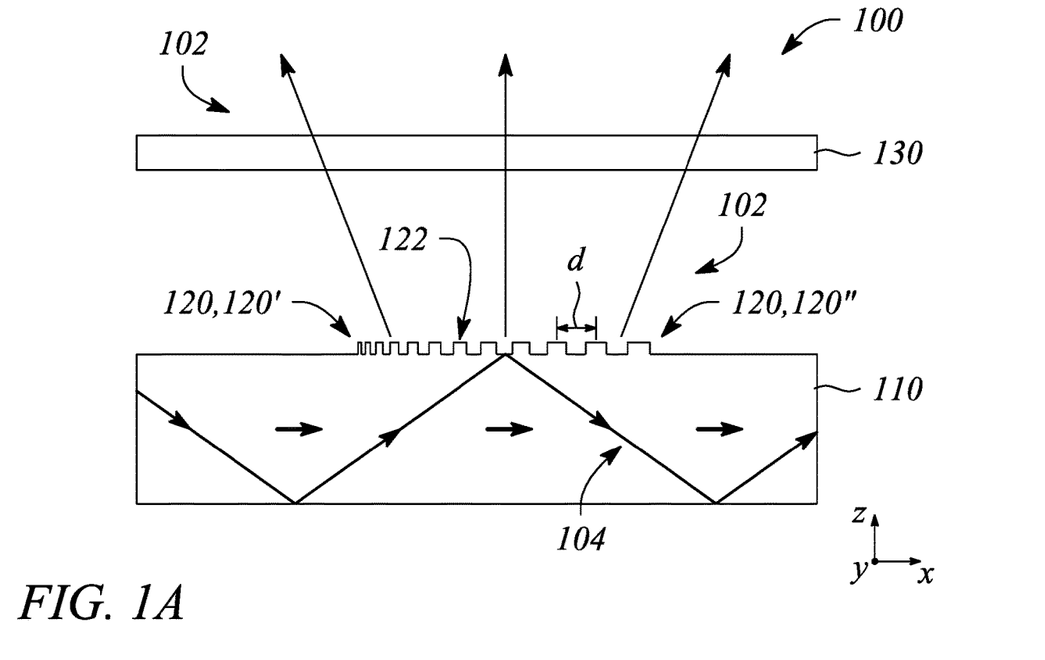
FIG. 1A illustrates a cross sectional view of a two-dimensional/three-dimensional (2D/3D) switchable display backlight, according to an example consistent with the principles described herein.
Figure 1B:
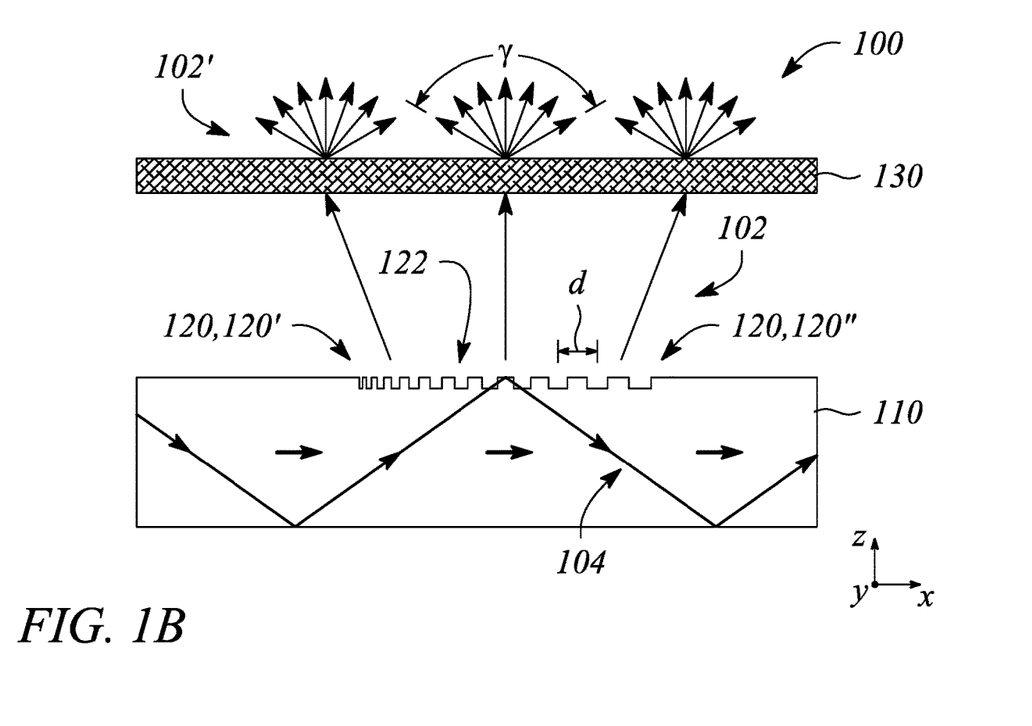
FIG. 1B illustrates a cross sectional view of a two-dimensional/three-dimensional (2D/3D) switchable display backlight, according to another example consistent with the principles described herein.

In accordance with some examples of the principles described herein, a two-dimensional/three-dimensional (2D/3D) switchable display backlight is provided. FIG. 1A illustrates a cross sectional view of a two-dimensional/three-dimensional (2D/3D) switchable display backlight 100, according to an example consistent with the principles described herein. FIG. 1B illustrates a cross sectional view of a 2D/3D switchable display backlight 100, according to another example consistent with the principles described herein. According to various examples, the 2D/3D switchable display backlight 100 is configured to produce 'directional' light, i.e., light comprising light beams 102 having different principal angular directions. For example, the 2D/3D switchable display backlight 100 may serve as a multibeam grating-based backlight configured to provide or generate a plurality of light beams 102 directed out and away from the 2D/3D switchable display backlight 100. Further, the light beams 102 of the plurality are directed out and away in different predetermined principal angular directions as the directional light, according to various examples.

In some examples, as described below, the plurality of light beams 102 having different predetermined principal angular directions forms a plurality of pixels of an electronic display. Moreover, the electronic display using the 2D/3D switchable display backlight 100 may be switchable between a 2-D electronic display (e.g., a conventional display) and a so-called 'glasses free' 3-D electronic display (e.g., a multiview, 'holographic' or autostereoscopic display). In particular, according to various examples, the 2D/3D switchable display backlight 100 employs controllable or selectable scattering of the light beams 102 to switch between a 2-D mode of operation and a 3-D mode of operation. For example, when a light beam 102 is selectably scattered, a 2-D operational mode is supported. Alternatively, a 3-D operational mode is supported in the absence of selective scattering. Selecting either the 2-D operational mode or the 3-D operational mode may facilitate switching the electronic display between displaying 2-D data and 3-D data, according to various examples (e.g., as described below).

As illustrated in FIGS. 1A-1B, the 2D/3D switchable display backlight 100 includes a light guide 110. In particular, the light guide 110 may be a plate light guide 110, according to various examples. The plate light guide 110 is configured to guide light from a light source (not illustrated in FIGS. 1A-1B). In some examples, the light from the light source is guided as a beam of light 104 along a length of the plate light guide 110. Further, the plate light guide 110 is configured to guide the light (i.e., the guided light beam 104) at a non-zero propagation angle. The guided light beam 104 may be guided at the non-zero propagation angle within the plate light guide 110 using total internal reflection, for example.

As defined herein, the non-zero propagation angle is an angle relative to a surface (e.g., a top surface or a bottom surface) of the plate light guide 110. In some examples, the non-zero propagation angle of the guided light beam may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees.

In some examples, the light from a light source is introduced or coupled into the plate light guide 110 at the non-zero propagation angle (e.g., about 30-35 degrees). One or more of a lens, a mirror or similar reflector (e.g., a tilted collimating reflector), and a prism (not illustrated) may facilitate coupling light into an input end the plate light guide 110 as the beam of light 104 at the non-zero propagation angle, for example. Once coupled into the plate light guide 110, the guided light beam 104 propagates along the plate light guide 110 in a direction that is generally away from the input end (e.g., illustrated by bold arrows pointing along an x-axis in FIGS. 1A and 1B). Further, the guide light beam 104 propagates by reflecting or 'bouncing' between the top surface and the bottom surface of the plate light guide 110 at the non-zero propagation angle (e.g., illustrated by an extended, angled arrow representing a light ray of the guided light 104).

Further, the guided light beam 104 produced by coupling light into the plate light guide 110 may be a collimated light beam, according to various examples. In particular, by 'collimated light beam' it is meant that rays of light within the guided light beam 104 are substantially parallel to one another within the guided light beam 104. Rays of light that diverge or are scattered from the collimated light beam of the guided light beam 104 are not considered to be part of the collimated light beam, by definition herein. Collimation of the light to produce the collimated guided light beam may be provided by the lens or mirror (e.g., tilted collimating reflector, etc.) used to couple the light into the plate light guide 110, for example.

In some examples, the plate light guide 110 may be a slab or plate optical waveguide comprising an extended, substantially planar sheet of optically transparent, dielectric material. The substantially planar sheet of dielectric material is configured to guide the guided light beam 104 using total internal reflection. According to various examples, the optically transparent material of the plate light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the plate light guide 110 may further include a cladding layer on at least a portion of a surface (e.g., one or both of the top surface and the bottom surface) of the plate light guide 110 (not illustrated). The cladding layer may be used to further facilitate total internal reflection, according to some examples.

As illustrated in FIGS. 1A-1B, the 2D/3D switchable display backlight 100 further includes a multibeam diffraction grating 120. According to various examples (e.g., as illustrated in FIGS. 1A-1B), the multibeam diffraction grating 120 is located at a surface of the plate light guide 110 (e.g., a top or front surface). In other examples (not illustrated), the multibeam diffraction grating 120 may be located within the plate light guide 110. The multibeam diffraction grating 120 is configured to couple out a portion of the guided light beam 104 from the plate light guide 110 by or using diffractive coupling. In particular, the coupled-out portion of the guided light beam 104 is diffractively redirected away from the plate light guide surface as coupled-out light comprising the plurality of light beams 102. As discussed above, each of the light beams 102 of the plurality has a different predetermined principal angular direction. Further, the light beams 102 are directed away from the plate light guide 110. For example, the light beams 102 may be directed away from the plate light guide surface at, in or on which the multibeam diffraction grating 120 is located, according to various examples.

In general, the light beams 102 produced by the multibeam diffraction grating 120 may be either diverging (e.g., as illustrated) or converging (not illustrated), according to various examples. In particular, FIGS. 1A-1B illustrate light beams 102 of the plurality that are diverging. Whether the light beams 102 are diverging or converging is determined by a propagation direction of the guided light beam 104 relative to a characteristic of the multibeam diffraction grating 120 (e.g., a 'chirp' direction). In some examples where the light beams 102 are diverging, the diverging light beams 102 may appear to be diverging from a 'virtual' point (not illustrated) located some distance below or behind the multibeam diffraction grating 120. Similarly, the converging light beams may converge or cross at a virtual point (not illustrated) above or in front of the multibeam diffraction grating 120 (e.g. the plate light guide front surface), according to some examples.

As further illustrated in FIGS. 1A-1B, the multibeam diffraction grating 120 includes a plurality of diffractive features 122 configured to provide diffraction. The provided diffraction is responsible for the diffractive coupling of the portion of the guided light beam 104 out of the plate light guide 110. For example, the multibeam diffraction grating 120 may include one or both of grooves in a surface of the plate light guide 110 (e.g., as illustrated in FIG. 1B) and ridges protruding from the plate light guide surface (e.g., as illustrated in FIG. 1A) that serve as the diffractive features 122. The grooves and ridges may be arranged parallel to one another and, at least at some point along the diffractive features 122, the grooves and ridges are perpendicular to a propagation direction of the guided light beam 104 that is to be coupled out by the multibeam diffraction grating 120.

In some examples, the grooves or ridges may be etched, milled or molded into the plate light guide surface or applied on the surface thereof. As such, a material of the multibeam diffraction grating 120 may include the material of the plate light guide 110. As illustrated in FIG. 1A, for example, the multibeam diffraction grating 120 includes substantially parallel ridges that protrude from the surface of the plate light guide 110. In FIG. 1B, the multibeam diffraction grating 120 includes substantially parallel grooves 122 that penetrate the surface of the plate light guide 110. In other examples (not illustrated), the multibeam diffraction grating 120 may be a film or layer applied or affixed to the light guide surface.

The multibeam diffraction grating 120 may be arranged in a variety of configurations at, on or in the surface of the plate light guide 110, according to various examples. For example, the multibeam diffraction grating 120 may be a member of a plurality of gratings (e.g., multibeam diffraction gratings) arranged in columns and rows across the light guide surface. The rows and columns of multibeam diffraction gratings 120 may represent a rectangular array of multibeam diffraction gratings 120, for example. In another example, the plurality of multibeam diffraction gratings 120 may be arranged as another array including, but not limited to, a circular array. In yet another example, the plurality of multibeam diffraction gratings 120 may be distributed substantially randomly across the surface of the plate light guide 110.

According to some examples, the multibeam diffraction grating 120 may be a chirped diffraction grating 120. By definition, the 'chirped' diffraction grating 120 is a diffraction grating exhibiting or having a diffraction pitch or spacing d of the diffractive features 122 that varies across an extent or length of the chirped diffraction grating 120, e.g., as illustrated in FIGS. 1A-1B. Herein, the varying diffraction spacing d is referred to as a 'chirp'. As a result, the guided light beam 104 that is diffractively coupled out of the plate light guide 110 exits or is emitted from the chirped diffraction grating 120 as coupled-out light comprising the plurality of light beams 102, as described herein. Moreover, the light is coupled out at different diffraction angles corresponding to different points of origin of respective ones of the light beams 102 across the chirped diffraction grating 120. By virtue of a predefined chirp, the chirped diffraction grating 120 is responsible for the predetermined and different principal angular directions of the light beams 102 of the plurality.

In some examples, the chirped diffraction grating 120 may have or exhibit a chirp of the diffractive spacing d that varies linearly with distance. As such, the chirped diffraction grating 120 may be referred to as a 'linearly chirped' diffraction grating. FIGS. 1A-1B illustrate the multibeam diffraction grating 120 as a linearly chirped diffraction grating, for example. In particular, as illustrated, the diffractive features 122 are closer together at a first end 120' of the multibeam diffraction grating 120 than at a second end 120". Further, the diffractive spacing d of the illustrated diffractive features 122 varies linearly from the first end 120' to the second end 120", by way of example.

In some examples, as mentioned above, the light beams 102 produced by coupling guided light beam 104 out of the plate light guide 110 using the multibeam diffraction grating 120 may diverge (i.e., be diverging light beams 102), e.g., when the guided light beam 104 propagates in a direction from the first end 120' to the second end 120" of the multibeam diffraction grating 120 (e.g., as illustrated in FIGS. 1A-1B). Alternatively, converging light beams 102 (not illustrated) may be produced when the guided light beam 104 propagates from the second end 120" to the first end 120' of the multibeam diffraction grating 120, according to other examples.

In another example (not illustrated), the chirped diffraction grating 120 may exhibit a non-linear chirp of the diffractive spacing d. Various non-linear chirps that may be used to realize the chirped diffraction grating 120 include, but are not limited to, an exponential chirp, a logarithmic chirp or a chirp that varies in another, substantially nonuniform or random but still monotonic manner. Non-monotonic chirps such as, but not limited to, a sinusoidal chirp or a triangle (or sawtooth) chirp, may also be employed. Combinations of any of these types of chirps may also be employed.

Figure 2:
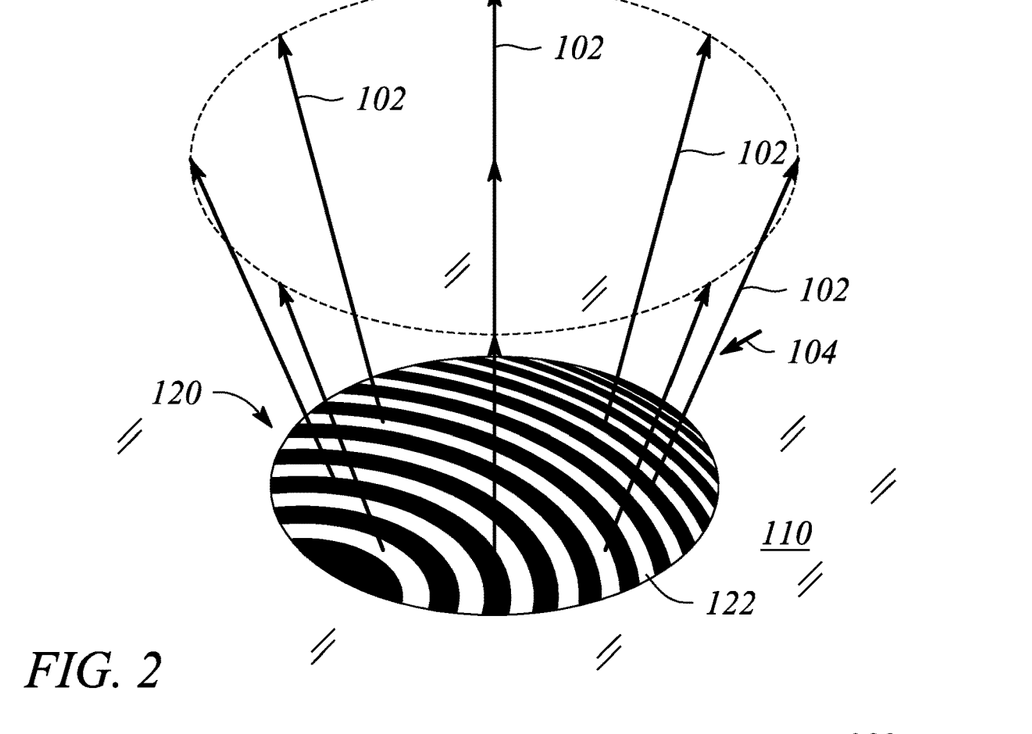
FIG. 2 illustrates a perspective view of a multibeam diffraction grating, according to an example consistent with the principles described herein.

FIG. 2 illustrates a perspective view of a multibeam diffraction grating 120, according to an example consistent with the principles described herein. As illustrated, the multibeam diffraction grating 120 includes diffractive features 122 (e.g., grooves or ridges) in, at or on a surface of the plate light guide 110 that are both curved and chirped (i.e., the multibeam diffraction grating 120 is a curved, chirped diffraction grating). The guided light beam 104 has an incident direction relative to the multibeam diffraction grating 120 and the plate light guide 110, as illustrated a bold arrow labeled 104 in FIG. 2. Also illustrated is the plurality of coupled-out or emitted light beams 102 pointing away from the multibeam diffraction grating 120 at the surface of the plate light guide 110. As illustrated, the light beams 102 are emitted in a plurality of predetermined different principal angular directions. In particular, the predetermined different principal angular directions of the emitted light beams 102 are different in both azimuth and elevation, as illustrated. According to various examples, both the predefined chirp of the diffractive features 122 and the curve of the diffractive features 122 may be responsible for the predetermined different principle angular directions of the emitted light beams 102.

Referring again to FIGS. 1A-1B, the 2D/3D switchable display backlight 100 further comprises a switchable diffuser 130 located to intercept the plurality of light beams 102. According to various examples, the switchable diffuser 130 has or provides a selectable first condition or state configured to pass light of a light beam 102 of the plurality. Additionally, the switchable diffuser 130 has or provides a selectable second condition or state configured to scatter light of the light beam 102. FIG. 1A illustrates the switchable diffuser 130 configured in the selectable first state to pass light, while FIG. 1B illustrates the switchable diffuser 130 configured in the selectable second state to scatter light. According to some examples, one or more of a degree of scattering, a scattering cone angle, and a scattering type also may be controllable in the selectable second state.

For example, in the selectable first state, the switchable diffuser 130 may be substantially transparent to light of the light beams 102 (e.g., as illustrated in FIG. 1A). As such, upon exiting the switchable diffuser 130 in the selectable first state, the light beams 102 may still have a principal angular direction related to, or in some examples, substantially similar to, the principle angular direction of the light beam incident upon the switchable diffuser 130, according to various examples. Moreover, the light beams 102 exiting the switchable diffuser 130 may be substantially similar to the light beams 102 entering the switchable diffuser 130 in the selectable first state in terms of one or both intensity and direction, according to some examples. For simplicity of discussion herein, no distinction is made between the light beam 102 incident upon and exiting the switchable diffuser 130 when the first state is selected, as illustrated in FIG. 1A.

On the other hand, as illustrated in FIG. 1B, the light beam 102 or light thereof is scattered or at least substantially scattered by the switchable diffuser 130 in the selectable second state. Therefore, the light 102' exiting the switchable diffuser 130 when the second state is selected no longer has the principal angular direction of the light beam 102 incident on or entering the switchable diffuser 130. Instead, the light 102' exiting the switchable diffuser 130 in the second state (scattering state) is scattered in a plurality of different directions (e.g., into a scattering cone angle or diffusion angle), according to various examples. Moreover, the plurality of different directions of the scattered light 102' produced by the selectable second state may be substantially unrelated to the principal angular directions of the light beams 102 incident on the switchable diffuser 130, according to some examples. FIG. 1B illustrates the scattered light 102' along with a scattering cone angle γ thereof, by way of example and not limitation.

In some examples, the switchable diffuser 130 may provide substantially isotropic scattering of the incident light beam 102 that approximates Lambertian scattering, e.g., 'near-Lambertian,' into the scattering cone angle γ. In other examples, the scattering may have a substantially Gaussian scattering distribution or may have another scattering distribution, for example. In some examples, the scattering cone angle γ may be controllable from a relatively narrow cone angle (e.g., less than about ten degrees) to a relatively wide cone angle (e.g., greater than about forty degrees). For example, the scattering cone angle γ may be between about sixty (60) degrees and about ninety (90) degrees. In another example, the scattering cone angle γ may be between about eighty (80) degrees and about one hundred eighty (180) degrees. As illustrated in FIG. 1B, the scattering cone angle γ is about one hundred twenty (120) degrees.

According to various examples, substantially any switchable or variable diffuser that provides scattering of light into a plurality of different (e.g., random or arbitrary) directions may be employed as the switchable diffuser 130. For example, in some examples, the switchable diffuser 130 may be based on a volumetric or bulk diffuser in which scattering is provided by embedded scattering centers having a variable characteristic such as, but not limited to, one or more of scattering center density, scattering center size and scattering center distribution. In other examples, the switchable diffuser 130 may be a surface diffuser configured to provide scattering or diffusion based on variable surface roughness. In some examples, the switchable diffuser 130 is an electronic switchable diffuser. For example, the switchable diffuser 130 may be a polymer-dispersed liquid crystal (PDLC) diffuser. In other examples, the switchable diffuser 130 may be based on another technology including, but not limited to, electrophoretics or electrowetting.

In other examples, the switchable diffuser 130 may employ an electromechanical means to switch between the selectable first and second states. For example, the switchable diffuser 130 may include a movable diffuser screen having a plurality of apertures. When an aperture is aligned with a light beam 102, the light beam passes through the switchable diffuser 130 without scattering (i.e., the selectable first state). On the other hand, when the screen is moved such that the light beam 102 passes through a scattering portion of the movable diffuser screen adjacent to the aperture, the light beam 102 is scattered and the switchable diffuser 130 provides the selectable second state. The switchable diffuser 130 may be implemented as a microelectromechanical system (MEMS) variable diffuser. The MEMS variable diffuser may implement the movable diffuser screen or a variable diffuser that employs electromechanically variable surface roughness, for example.

According to various examples, selection of or between the selectable first state (non-scattering state) and the selectable second state (scattering state) may be provided by a control input of the switchable diffuser 130. For example, the switchable diffuser 130 may be an electronic switchable or variable diffuser (e.g., a PDLC) in which a first control input to the electronic switchable diffuser is configured to provide the first state and pass the light beam 102 and a second control input is configured to provide the second state and scatter the light beam. The first control input may be a first voltage and the second control input may be a second voltage, for example.

According to some examples of the principles described herein, a 2D/3D switchable electronic display is provided. The 2D/3D switchable electronic display is configured to emit modulated light as pixels. Further, the 2D/3D switchable electronic display may be switched between or selectably configured to provide a first or three-dimensional (3-D) mode and a second or two-dimensional (2-D) mode of operation. In particular, in the 3-D mode, the modulated light beams may be preferentially directed toward a viewing direction of the 2D/3D switchable electronic display as a plurality of differently directed, modulated light beams having predetermined principal angular directions and corresponding to different 3-D views. In particular, the 2D/3D switchable electronic display in the 3-D mode is a 3-D electronic display (e.g., a glasses-free, 3-D electronic display). Different ones of the modulated, differently directed light beams correspond to different 'views' associated with the 2D/3D switchable electronic display in the 3-D mode, according to various examples. The different 'views' may provide a 'glasses free' (e.g., autostereoscopic or holographic) representation of 3-D information being displayed by the 2D/3D switchable electronic display in the 3-D mode, for example. On the other hand, in the 2-D mode, the modulated light beams are scattered in a plurality of arbitrary different directions representing diffuse light to serve as 2-D pixels to display 2-D information, for example.

Figure 3:
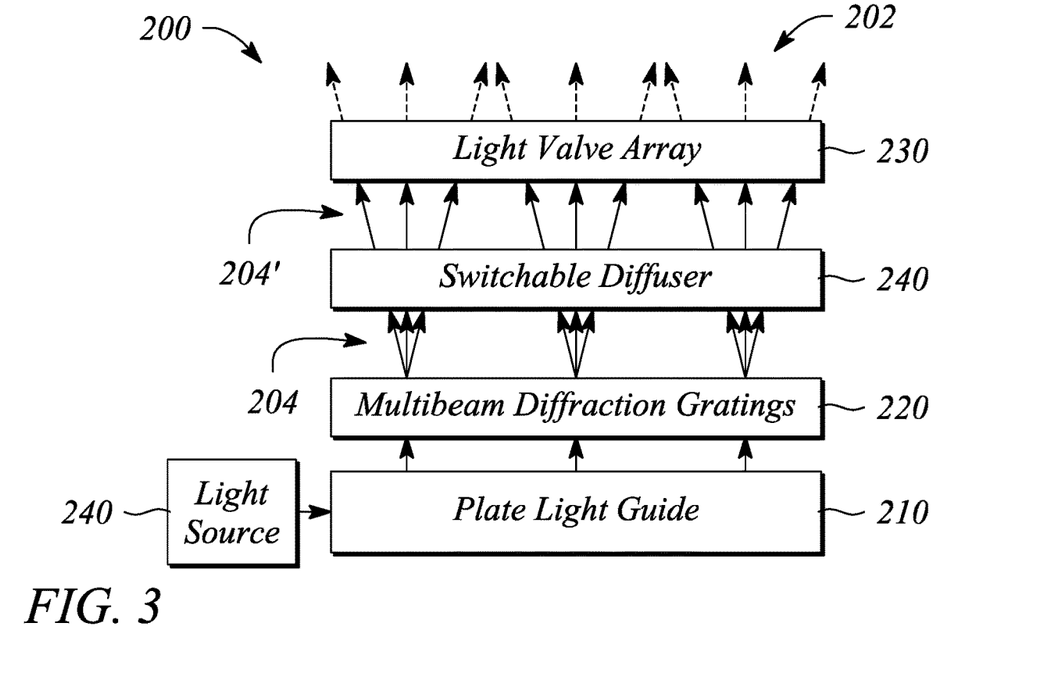
FIG. 3 illustrates a block diagram of a 2D/3D switchable electronic display, according to an example consistent with the principles described herein.

FIG. 3 illustrates a block diagram of a 2D/3D switchable electronic display 200, according to an example consistent with the principles described herein. The 2D/3D switchable electronic display 200 illustrated in FIG. 3 includes a plate light guide 210 to guide light (e.g., as a beam of light). The guided light may be collimated and, therefore guided as a collimated light beam, for example. The guided light in the plate light guide 210 is a source of the light that becomes either modulated light beams 202 or diffuse light emitted by the 2D/3D switchable electronic display 200 (e.g., in a 3-D mode or a 2-D mode, respectively). According to some examples, the plate light guide 210 may be substantially similar to the plate light guide 110 described above with respect to the 2D/3D switchable display backlight 100. For example, the plate light guide 210 may be a slab optical waveguide that is a planar sheet of dielectric material configured to guide light by total internal reflection.

Further as illustrated in FIG. 3, the 2D/3D switchable electronic display 200 includes an array of multibeam diffraction gratings 220. The array of multibeam diffraction gratings 220 are at or adjacent to a surface of the plate light guide 210. In some examples, a multibeam diffraction grating 220 of the array may be substantially similar to the multibeam diffraction grating 120 of the 2D/3D switchable display backlight 100, described above. In particular, the multibeam diffraction grating 220 is configured to couple out a portion of the guided light in the plate light guide 210 as a plurality of light beams 204. Further, the multibeam diffraction grating 220 is configured to direct the light beams 204 in a corresponding plurality of predetermined different principal angular directions.

In some examples, the multibeam diffraction grating 220 comprises a chirped diffraction grating. In some examples, diffractive features (e.g., grooves, ridges, etc.) of the multibeam diffraction grating 220 are curved diffractive features. In yet other examples, the multibeam diffraction grating 220 of the array includes a chirped diffraction grating having curved diffractive features. For example, the curved diffractive features may include a ridge or a groove that is curved (i.e., continuously curved or piece-wise curved). Further, the curved diffractive features may be spaced apart from one another by a spacing between the curved diffractive features that varies as a function of distance across the multibeam diffraction grating 220 (e.g., a 'chirped' spacing).

As illustrated in FIG. 3, the 2D/3D switchable electronic display 200 further includes a light valve array 230. The light valve array 230 includes a plurality of light valves configured to modulate the light 204' corresponding to light beams 204 of the plurality, according to various examples. A number of light valves of the light valve array 230 may be substantially similar to a number of the light beams 204, for example. In particular, the light valves of the light valve array 230 modulate the light 204' of or corresponding to the light beams 204 to provide the pixels of the 2D/3D switchable electronic display 200.

For example, when the 2D/3D switchable electronic display 200 is switched into or operated in the 3-D mode, the pixels may be 3-D pixels that correspond to different views of the 3-D electronic display. Alternatively, the pixels may be 2-D pixels when the 2D/3D switchable electronic display 200 is operated in the 2-D mode, for example. In some examples, a display resolution or equivalently, a pixel density may be a native resolution or density of the light valve array 230 in the 2-D mode, while the display resolution or pixel density in the 3-D mode may be lower than the native resolution/density. In various examples, different types of light valves may be employed in the light valve array 230 including, but not limited to, one or both of liquid crystal light valves and electrophoretic light valves.

According to various examples, the 2D/3D switchable electronic display 200 further includes a switchable diffuser 240. The switchable diffuser 240 is configured to either selectably pass a light beam 204 of the plurality or selectably scatter the light beam 204. As such, the switchable diffuser 240 outputs light 204' corresponding to the light beam 204 that is either passed (i.e., substantially similar to the light beam 204) or scattered (e.g., into a scattering cone angle). Switching the switchable diffuser 240 between passing and scattering the light beams 204 corresponds to switching the 2D/3D switchable electronic display between the 3-D operational mode and the 2-D operational mode, according to various examples.

According to some examples, the switchable diffuser 240 may be substantially similar to the switchable diffuser 130 described above with respect to the 2D/3D switchable display backlight 100. In particular, the switchable diffuser 240 when configured to pass a light beam 204 may be substantially similar to the switchable diffuser 130 in which the first state has been selected, while the switchable diffuser 240 when configured to scatter the light beam light may be substantially similar to the switchable diffuser 130 having the second state selected. Further, in some examples, the switchable diffuser 240 may be an electronic switchable or variable diffuser such as, but not limited to, one or more of a PDLC diffuser, an electrophoretic-based variable diffuser, and a variable diffuser based on electrowetting. In other examples, a mechanical or an electromechanical variable diffuser (e.g., a movable diffuser screen, a MEMS diffuser, etc.) may be used as the switchable diffuser 240.

According to some examples (e.g., as illustrated in FIG. 3), the switchable diffuser 240 is located between the light valve array 230 and the array of multibeam diffraction gratings 220. When located between the light valve array 230 and the array of multibeam diffraction gratings 220, the switchable diffuser 240 intercepts and selectably either passes or scatters the the light beams 204 prior to modulation by the light valves of the light valve array 230. For example, when the switchable diffuser 240 is configured to pass the light beams 204 from the multibeam diffraction gratings 220, the light valve array 230 modulates the light 204' corresponding to the light beams 204 which then may continue on to be viewed as 3-D pixels as the modulated light beams 202. Alternatively, when the switchable diffuser 240 is configured to scatter the light beams 204, the scattered light 204' corresponding to the light beams 204 is modulated by the light valve array 230 to produce 2-D pixels (not illustrated). The modulated light (e.g., as modulated light beams 202) is illustrated as dashed-line arrows emanating from the light valve array 230 in FIG. 3, by way of example.

In other examples (not illustrated in FIG. 3), the switchable diffuser 240 is located at an output of the light valve array 230 to selectably either pass or scatter light beams 204 of the plurality. For example, see FIG. 4B and the description below. Accordingly, the light beams 204 are modulated by the light valves of the light valve array 230 prior to being either selectably passed or scattered by the switchable diffuser 240. However, whether located between the multibeam diffraction gratings 220 and the light valve array 230 or at an output of the light valve array 230, the switchable diffuser 240 provides a selectably 2-D or 3-D view from the 2D/3D switchable electronic display 200, according to various examples.

In yet other examples (not illustrated), the switchable diffuser may be located substantially within the light valve array. For example, when the light valve array is implemented using liquid crystal light valves, the switchable diffuser may be between an input polarizer and a liquid crystal cell containing the liquid crystal material. In another example, the switchable diffuser may be located between the liquid crystal cell and an output polarizer. Note that when located between the liquid crystal cell and a polarizer of the liquid crystal light valve, a switchable diffuser that does not adversely affect light polarization may be employed, according to various examples.

Figure 4A:
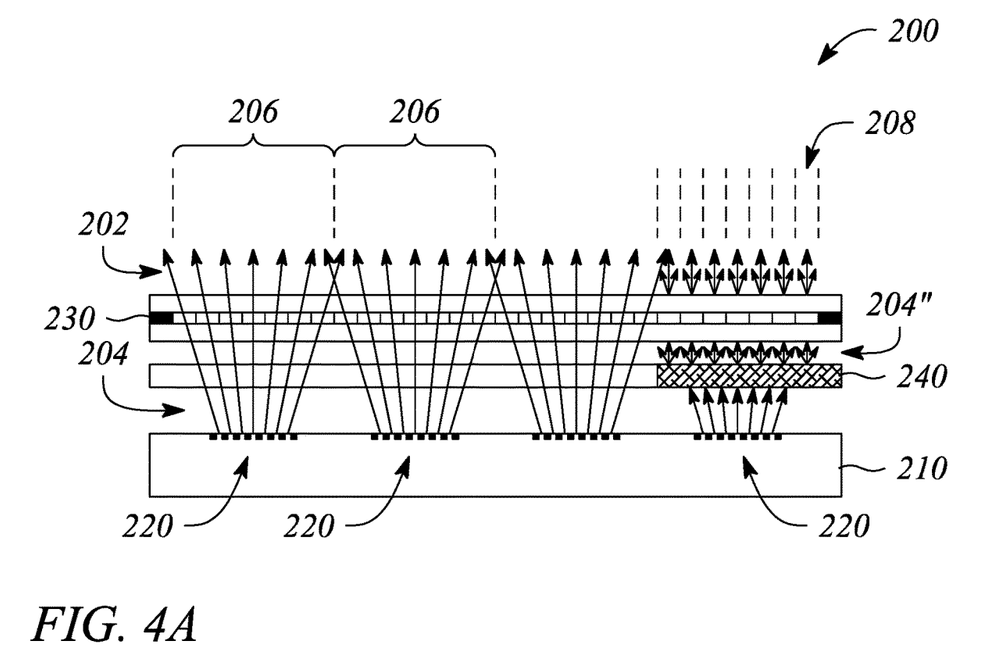
FIGS. 4A and 4B illustrate cross sectional views of a 2D/3D switchable electronic display, according to different examples consistent with the principles described herein.
Figure 4B:
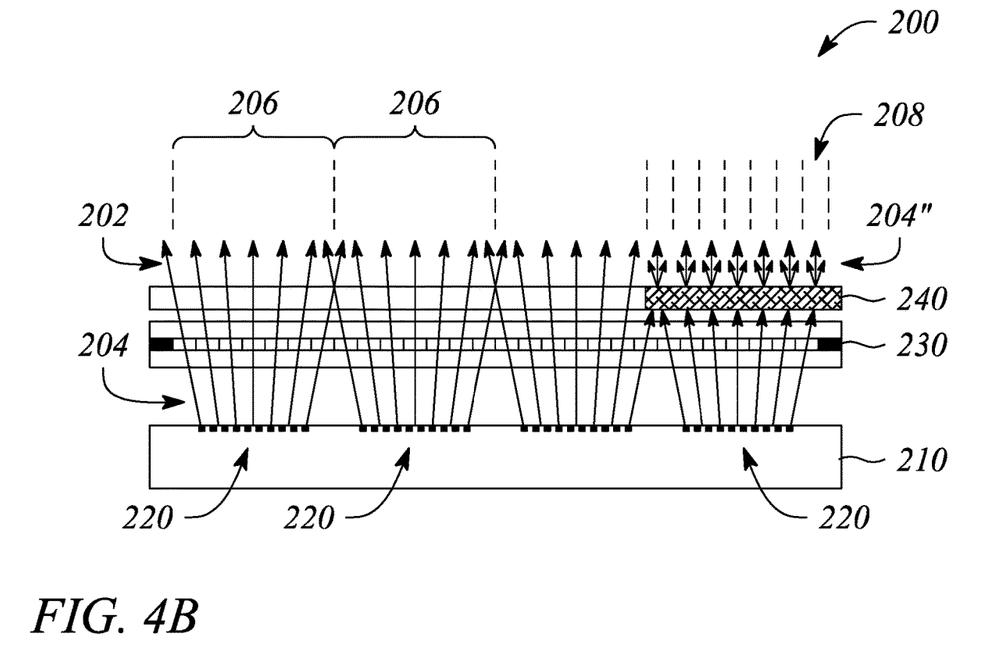

FIG. 4A illustrates a cross sectional view of the 2D/3D switchable electronic display 200, according to an example consistent with the principles described herein. FIG. 4B illustrates a cross sectional view of the 2D/3D switchable electronic display 200, according to another example consistent with the principles described herein. In particular, FIG. 4A illustrates the switchable diffuser 240 located between the array of multibeam diffraction gratings 220 and the light valve array 230 (e.g., as illustrated in FIG. 3). FIG. 4B illustrates the switchable diffuser 240 at the output (i.e., adjacent an output side) of the light valve array 230. As such, the light valve array 230 is between the array of multibeam diffraction gratings 220 and the switchable diffuser 240, as illustrated. Further, the array of multibeam diffraction gratings 220 is illustrated at the surface of the plate light guide 210 in FIGS. 4A and 4B.

Referring to FIG. 4A, light emitted by the multibeam diffraction gratings 220 and corresponding to the light beams 204 is intercepted by and selectably either passed or scattered by the switchable diffuser 240 as illustrated using various arrows in FIG. 4A. In particular, light beams 204 that are selectably passed through by the switchable diffuser 240 may continue on to the light valve array 230 to be modulated into light beams 202. The modulated light beams 202 may represent 3-D pixels 206 of the 2D/3D switchable electronic display 200 operated in the 3-D mode, for example. Light beams 204 that are selectably scattered by the switchable diffuser 240 become scattered or diffuse light 204" as illustrated by a plurality of short arrows. The scattered light 204" may continue on to the light valve array 230 to be modulated and to represent 2-D pixels 208 of the 2D/3D switchable electronic display 200 operated in the 2-D mode, according to various examples.

Referring to FIG. 4B, light emitted by the multibeam diffraction gratings 220 and corresponding to the light beams 204 is first modulated by the light valve array 230 and then intercepted by and selectably either passed through or scattered by switchable diffuser 240. In the 3-D mode operation, the light beams 204 that are first modulated by the light valve array 230 and then selectably passed through by the switchable diffuser 240 also continue on and represent 3-D pixels 206 of the 2D/3D switchable electronic display 200. In the 2-D mode operation, the modulated light beams 204 that are selectably scattered by the switchable diffuser 240 become scattered or diffuse light 204" at an output side of the switchable diffuser 240, e.g., illustrated as a plurality of short arrows. For example, in FIGS. 4A and 4B, the plurality of short arrows illustrating the scattered light 204" is arranged to represent a scattering cone angle of the switchable diffuser 240. In FIG. 4B, the scattered light 204" is derived from the modulated light beams 204 that are output by the light valve array 230 and therefore, represent the 2-D pixels 208 of the 2D/3D switchable electronic display 200 operated in the 2-D mode, according to various examples.

As illustrated in FIGS. 4A and 4B, a resolution of the 2-D pixels 208 may have or be substantially similar to the native resolution of the light valve array 230, while a resolution of the 3-D pixels 206 is lower than the native resolution, according to various examples. For example, the 3-D pixel resolution may be determined by a number of 3-D views, while the 2-D resolution may be determined by a number of light valves in the light valve array 230 (e.g., light valves per inch or the 'native' resolution). When there are sixty-four (64) 3-D views supported by the 2D/3D switchable electronic display 200, for example, the 2-D resolution may be 64 times the 3-D resolution. In other examples, the 2-D resolution may be two times, four times, eight times, or more than the 3-D resolution.

Note that the switchable diffuser 240 may be configured to selectably pass light beams 204 in some regions of the 2D/3D switchable electronic display 200, while selectably scattering light beams 204 in other regions (e.g., as illustrated in FIGS. 4A and 4B), according to some examples. By selectably passing and scattering light beams 204 in different regions, the switchable diffuser 240 may facilitate simultaneously displaying 2-D information and 3-D information using the 2D/3D switchable electronic display 200 (e.g., in the different regions). In particular, the switchable diffuser 240 may comprise a plurality of different regions across a display area of the 2D/3D switchable electronic display 200. The switchable diffuser 240 may be separately configured to selectably either pass or scatter the light beams 204 in the a first region of the plurality of different regions and selectably either pass or scatter the light beams 204 in a second region. In regions in which the switchable diffuser 240 is configured to selectably scatter the light beams 204, pixels may be or represent 2-D pixels 208 used to display 2-D information (e.g., text). Alternatively, pixels may be 3-D pixels 206 used to display 3-D information in regions of the 2D/3D switchable electron display 200 corresponding to switchable diffuser regions that are configured to selectably pass the light beams 204.

Figure 4C:
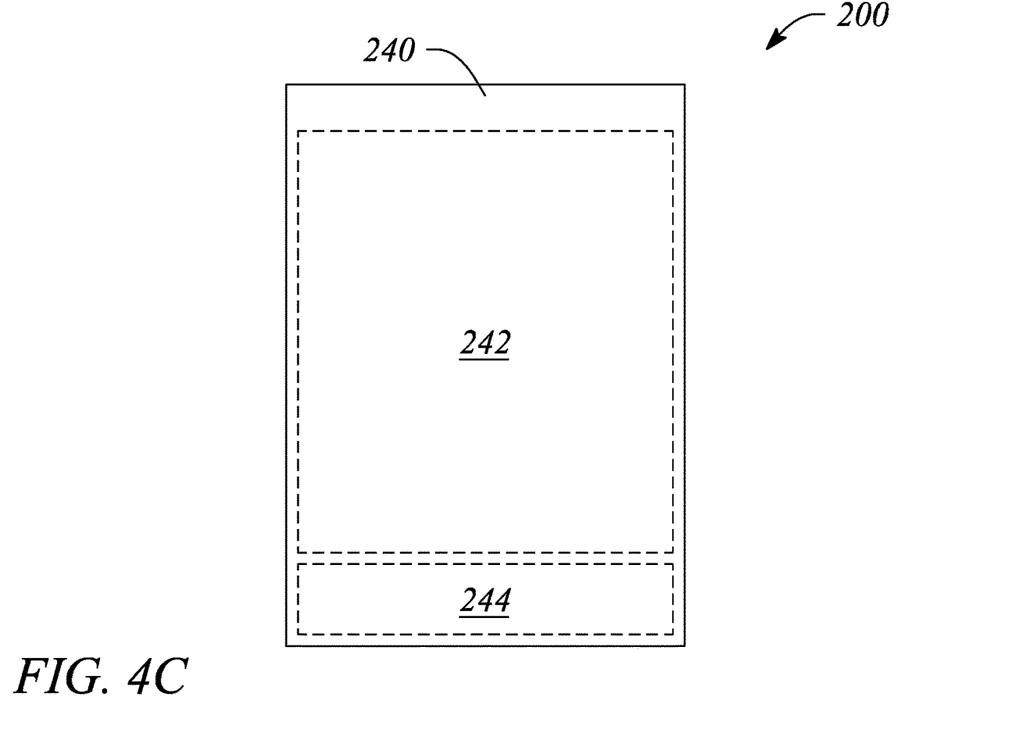
FIG. 4C illustrates a plan view of a 2D/3D switchable electronic display having a plurality of different regions, according to another example consistent with the principles described herein.

FIG. 4C illustrates a plan view of a 2D/3D switchable electronic display 200 having a plurality of different regions, according to an example consistent with the principles described herein. In particular, the illustrated 2D/3D switchable electronic display 200 has different regions that may be separately configured to display either 2-D information of 3D information using the switchable diffuser 240, according to various examples. As illustrated, the 2D/3D switchable electronic display 200 has a switchable diffuser 240 comprising a first region 242 and a second region 244. The first and second regions 242, 244 may be regions of the switchable diffuser 240 that are individually or separately controllable, for example.

In some examples, the first region 242 may be configured to selectably pass light beams 204 through the first region 242, while the second region 244 is configured to selectably scatter the light beams 204 within the second region 244. In these examples, the first region 242 is configured to display 3-D information and the second region 244 is configured to display 2-D information (e.g., text, etc.). For example, the second region 244 may be used to display a text-based menu and the first region 242 may be used to display a 3-D image. The second region 244 may then be reconfigured to selectably pass the light beams 204 such that both the first and second regions 242, 244 may be used 3-D information display. Further, both the first and second regions 242, 244 may be reconfigured to selectably scatter the light beams 204 such that the 2D/3D switchable electronic display 200 may be used for 2-D information display.

In other examples (not illustrated), a region of the 2D/3D switchable electronic display may comprise a fixed or non-switchable diffuser and another region may comprise either a switchable diffuser 240, as described above, or no diffuser. In these examples, the region with the fixed diffuser is dedicated to 2-D information display. The other region may be used selectably for 2-D information display and 3-D information display when the switchable diffuser is present. Alternatively, the other region may be dedicated to 3-D information display when no diffuser is present, for example.

Referring again to FIG. 3, the 2D/3D switchable electronic display 200 may further include a light source 250, in some examples. The light source 250 is configured to provide light that propagates in the plate light guide 210 as the guided light. In particular, the guided light is light from the light source 250 that is coupled into the edge (or input end) of the plate light guide 210, according to some examples. For example, a lens, a collimating reflector or similar device (not illustrated) may facilitate coupling of light into the plate light guide 110 at the input end or edge thereof. In various examples, the light source 250 may be substantially any source of light including, but not limited to, one or more of a light emitting diode (LED), a fluorescent light and a laser. In some examples, the light source 250 may produce a substantially monochromatic light having a narrowband spectrum denoted by a particular color. In particular, the color of the monochromatic light may be a primary color of a particular color gamut or color model (e.g., a red-green-blue (RGB) color model). In some examples, the light source 250 may include a plurality of different color light sources.

In some examples, the 2D/3D switchable electronic display 200 may experience so-called 'walk-off' of the pixels. In particular, if the switchable diffuser 240 is sufficiently far away from the array of multibeam diffraction gratings 220, walk-off may occur. The term 'walk-off' when applied to pixels herein is defined as a pixel that is in a location that is out of sequence or out of position with respect to other pixels a display. In particular, the pixel may be out of sequence and thus result in walk-off when light beams 204 of the plurality produced by the array of multibeam diffraction gratings 220 cross one another. The switchable diffuser 240 may be spaced apart from the array of multibeam diffraction gratings 220 to an extent that results in walk-off due to respective thickness of various elements of the 2D/3D switchable electronic display, e.g., a thickness of the light valve array 230, a thickness of the switchable diffuser 240, etc.

Walk-off may be mitigated by locating the switchable diffuser 240 at a distance from the array of multibeam diffraction gratings 220 corresponding to a crossover point of light beams 204, according to various examples. For example, the switchable diffuser 240 may be spaced from the array of multibeams diffraction gratings 220 by about a distance at which a first light beam 204 intersects or crosses over a second light beam 204 of the plurality to mitigate walk-off. The crossover point may be a first crossover point or another crossover point (e.g., a second, third, etc., crossover point located further from the multibeam diffraction grating 220).

Figure 5:
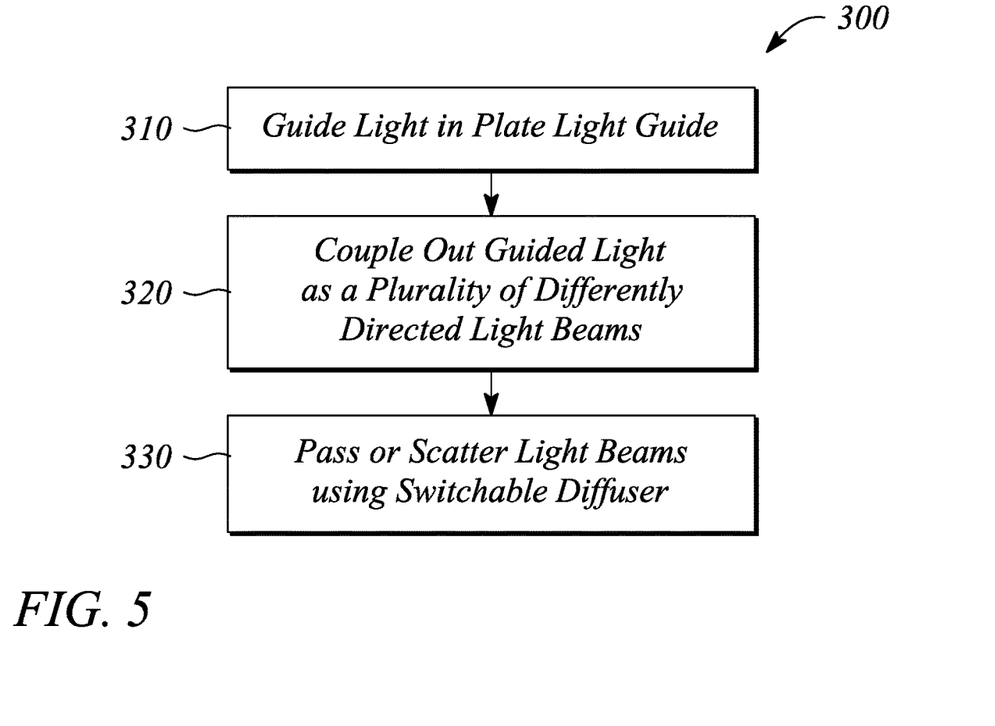
FIG. 5 illustrates a flow chart of a method of 2D/3D switchable electronic display operation, according to an example consistent with the principles described herein.

According to some examples of the principles described herein, a method of 2D/3D switchable electronic display operation is provided. FIG. 5 illustrates a flow chart of a method 300 of 2D/3D switchable electronic display operation, according to an example consistent with the principles described herein. As illustrated in FIG. 5, the method 300 of 2D/3D switchable electronic display operation includes guiding 310 light in a plate light guide as a beam of light at a non-zero propagation angle. In some examples, the plate light guide and the guided light may be substantially similar to the plate light guide 110 and the guided light beam 104, described above with respect to the 2D/3D switchable display backlight 100. In particular, the plate light guide guides 310 the guided light beam according to total internal reflection and in some examples, the guided light beam may be collimated. Further, the plate light guide may be a substantially planar dielectric optical waveguide or slab waveguide (e.g., a planar dielectric sheet), in some examples.

As illustrated in FIG. 5, the method 300 of 2D/3D switchable electronic display operation further includes coupling out 320 a portion of the guided light. In particular, the portion of guided light that is coupled out 320 of the plate light guide may include a plurality of light beams. Light beams of the plurality of light beams are directed away from a surface of the plate light guide. Moreover, a light beam of the light beam plurality that is directed away from the plate light guide surface has a different principal angular direction from other light beams of the plurality. In some examples, each light beam of the plurality has a different principal angular direction relative to the other light beams of the plurality.

In some examples, coupling out 320 a portion of the guided light comprises diffractively coupling out the guided light portion using a multibeam diffraction grating. According to some examples, the multibeam diffraction grating may be located at or adjacent to a surface of the plate light guide. For example, the multibeam diffraction grating may be formed on or in the surface (e.g. a top surface) of the plate light guide as grooves, ridges, etc., and may be formed of a material of the plate light guide. In other examples, the multibeam diffraction grating may include a film on the plate light guide surface. In some examples, the multibeam diffraction grating is substantially similar to the multibeam diffraction grating 120 described above with respect to 2D/3D switchable display backlight 100.

The method 300 of 2D/3D switchable electronic display illustrated in FIG. 5 further includes selectably either passing or scattering 330 light beams of the plurality using a switchable diffuser. Light beams of the plurality may represent three-dimensional (3-D) pixels of the 2D/3D switchable electronic display when selectably passed 330 by the switchable diffuser and may represent two-dimensional (2-D) pixels of the 2D/3D switchable electronic display when selectably scattered 330 by the switchable diffuser. According to some examples, the switchable diffuser used in selectably either passing or scattering 330 light beams may be substantially similar to the switchable diffuser 130 of the 2D/3D switchable display backlight 100, described above. In particular, the switchable diffuser may include one or both of an electronic variable diffuser and a mechanical/electromechanical variable diffuser. The electronic variable diffuser may include, but is not limited to, a polymer dispersed liquid crystal diffuser, an electrophoretic-based diffuser or a variable diffuser based on electrowetting, while the mechanical/electromechanical variable diffuser may include, but is not limited to, one or both of a movable diffuser screen and a variable diffuser that employs electromechanically variable surface roughness (e.g., a MEMS variable diffuser).

According to some examples (not illustrated in FIG. 5), the method 300 of 2D/3D switchable electronic display further includes modulating the plurality of light beams using a plurality of light valves. According to some examples, the plurality of light valves may be substantially similar to the light valve array 230 described above with respect to the 2D/3D switchable electronic display 200. For example, the plurality of light valves may include a plurality of liquid crystal light valves. In some examples, selectably either passing or scattering 330 light beams of the plurality is performed using the switchable diffuser after modulating the plurality of light beams (e.g., as illustrated in FIG. 4B). In other examples, selectably either passing or scattering 330 light beams of the plurality with the switchable diffuser is performed prior to modulating the light beams (e.g., as illustrated in FIG. 4A).

Thus, there have been described examples of a 2D/3D switchable display backlight, a 2D/3D switchable electronic display, and a method of 2D/3D switchable electronic display operation that employ a switchable diffuser. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A two-dimensional/three-dimensional (2D/3D) switchable display backlight comprising:
a plate light guide configured to guide light from a light source as a guided light beam;
an array of multibeam diffraction gratings spaced apart from one another along the plate light guide, each multibeam diffraction grating of the multibeam diffraction grating array comprising a plurality of diffractive features and being configured to diffractively couple out a portion of the guided light beam and to direct the coupled-out portion away from the plate light guide, the diffractively coupled-out portion comprising a plurality of light beams having different principal angular directions; and
a switchable diffuser located to intercept the plurality of light beams, the switchable diffuser being configured to selectably either pass light of a light beam of the plurality or scatter the light beam,
wherein the plurality of light beams that is diffractively coupled-out of the multibeam diffraction gratings is configured to support presentation of an autostereoscopic image in a three-dimensional (3-D) mode.

2. An electronic display comprising the 2D/3D switchable display backlight of claim 1, wherein the diffractively coupled-out portion of the guided light beam is light corresponding to a pixel of the electronic display, the pixel being switchable to either a 3-D pixel of the electronic display or a two-dimensional (2-D) electronic display pixel using the switchable diffuser.

3. The electronic display of claim 2, further comprising a light valve configured to modulate a light beam of the plurality of light beams, the multibeam diffraction grating being between the light valve and the plate light guide.

4. The electronic display of claim 3, wherein the switchable diffuser is between the multibeam diffraction grating and the light valve.

5. The 2D/3D switchable display backlight of claim 1, wherein the multibeam diffraction grating comprises a chirped diffraction grating.

6. The 2D/3D switchable display backlight of claim 5, wherein the chirped diffraction grating is a linearly chirped diffraction grating.

7. The 2D/3D switchable display backlight of claim 1, wherein the multibeam diffraction grating is at a surface of the plate light guide, the multibeam diffraction grating having diffractive features comprising one or both of curved grooves in the plate light guide surface and curved ridges on the plate light guide surface, the diffractive features being spaced apart from one another.

8. The 2D/3D switchable display backlight of claim 1, wherein the switchable diffuser has electronically controlled, selectable states comprising a first state to pass the light beam and a second state to scatter the light beam.

9. The 2D/3D switchable display backlight of claim 1, wherein the switchable diffuser comprises a polymer dispersed liquid crystal electronic diffuser.

10. A two-dimensional/three-dimensional (2D/3D) switchable electronic display, comprising:
a plate light guide configured to guide light from a light source as a guided light beam;
an array of multibeam diffraction gratings spaced apart from one another at a surface of the plate light guide, each multibeam diffraction grating of the multibeam diffraction grating array comprising a plurality of diffractive features and being configured to diffractively couple out a portion of the guided light beam as a plurality of light beams having a corresponding plurality of different principal angular directions;
a light valve array configured to modulate light corresponding to light beams of the light beam plurality to provide a plurality of simultaneous views of a multiview image in a three-dimensional (3-D) mode; and
a switchable diffuser configured to selectably either pass a light beam of the light beam plurality to provide a 3-D pixel or scatter the light beam to provide a two-dimensional (2-D) pixel of the 2D/3D switchable electronic display.

11. The 2D/3D switchable electronic display of claim 10, wherein a multibeam diffraction grating of the multibeam diffraction grating array is a chirped diffraction grating having curved diffractive features.

12. The 2D/3D switchable electronic display of claim 10, wherein the light valve array comprises a plurality of liquid crystal light valves.

13. The 2D/3D switchable electronic display of claim 10, wherein the switchable diffuser is located between the light valve array and the array of multibeam diffraction gratings.

14. The 2D/3D switchable electronic display of claim 10, wherein the switchable diffuser is located adjacent to an output of the light valve array to selectably either pass or scatter modulated light.

15. The 2D/3D switchable electronic display of claim 10, wherein the switchable diffuser is spaced apart from the array of multibeam diffraction gratings by a distance at which a light beam of the light beam plurality intersects another light beam of the light beam plurality to mitigate walk-off.

16. The 2D/3D switchable electronic display of claim 10, wherein the switchable diffuser comprises a plurality of different regions across a display area of the 2D/3D switchable electronic display, the switchable diffuser being separately configured to selectably either pass or scatter the light beam in a first region of the plurality of regions and selectably either pass or scatter the light beam in a second region of the plurality of regions.

17. A method of 2D/3D switchable electronic display operation, the method comprising:
guiding light in a plate light guide as a beam of light at a non-zero propagation angle;
diffractively coupling out a portion of the guided light beam to produce a plurality of light beams directed away from the plate light guide in a corresponding plurality of different principal angular directions using an array of multibeam diffraction gratings spaced apart from one another along the plate light guide, each multibeam diffraction grating of the multibeam diffraction grating array diffractively coupling out a separate portion of the guided light to produce a corresponding separate plurality of the light beams; and
selectably either passing or scattering light beams of the light beam plurality using a switchable diffuser,
wherein selectably passed light beams of the light beam plurality represent three-dimensional (3-D) pixels of the 2D/3D switchable electronic display and selectably scattered light beams of the light beam plurality represent two-dimensional (2-D) pixels of the 2D/3D switchable electronic display, the 3-D pixel forming a portion of an autostereoscopic image.

18. The method of 2D/3D switchable electronic display operation of claim 17, further comprising modulating light of the plurality of light beams using a plurality of light valves.

19. The method of 2D/3D switchable electronic display operation of claim 18, wherein selectably either passing or scattering light beams of the plurality is performed after modulating light of the plurality of light beams.

20. The method of 2D/3D switchable electronic display operation of claim 18, wherein the plurality of light valves comprises a plurality of liquid crystal light valves, and wherein the multibeam diffraction grating used in diffractive coupling out comprises a chirped diffraction grating having curved diffractive features.

21. The method of 2D/3D switchable electronic display operation of claim 17, wherein the switchable diffuser is an electronic variable diffuser selected from a polymer dispersed liquid crystal diffuser, an electrophoretic-based diffuser or a variable diffuser based on electrowetting.

* * * * *